United States Patent [19]
Samura et al.

[11] 3,747,185
[45] July 24, 1973

[54] APPARATUS FOR ASSEMBLING OR WORKING A WORKPIECE

[75] Inventors: Hiroyoshi Samura, Tokyo; Mitsuyoshi Nagashima, Sayama; Osamu Washimine, Higashiyamato, all of Japan

[73] Assignee: Citizen Watch Co., Ltd., Tokyo, Japan

[22] Filed: Dec. 20, 1971

[21] Appl. No.: 209,831

[30] Foreign Application Priority Data
Dec. 28, 1970 Japan.............................. 45/129431

[52] U.S. Cl.............................. 29/200 A, 29/200 P
[51] Int. Cl....................... B23p 19/00, B23p 21/00
[58] Field of Search ...................... 29/200 A, 200 P, 29/200 B, 208 C, 208 R, 200 J

[56] References Cited
UNITED STATES PATENTS
3,648,346   3/1972   Graham .................... 29/200 A Primary Examiner—Thomas H. Eager
Attorney—William D. Hall et al.

[57] ABSTRACT

A transfer machine comprising conveyor belt means for conveying a workpiece, a pair of guide rails for guiding the workpiece on the conveyor means, fluidic detecting means for detecting the workpiece so as to operate an escape mechanism for stopping the workpiece, lifting the workpiece from the conveyor belt means so that a desired working, machining, or assembling is performed, and thereafter lowering the workpiece onto the conveyor means.

3 Claims, 9 Drawing Figures

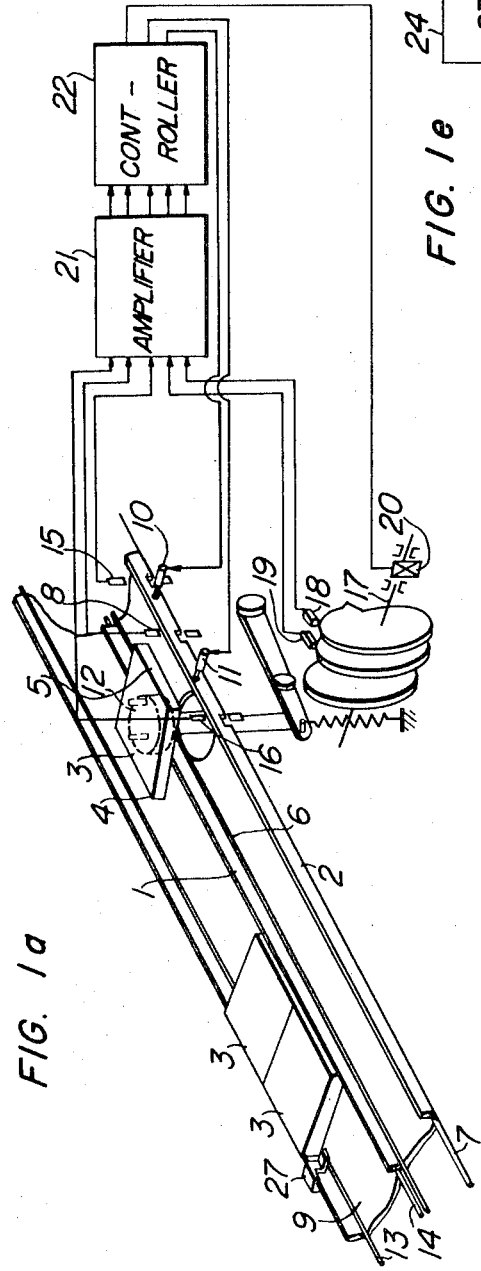
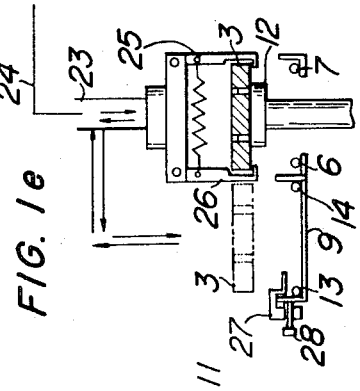
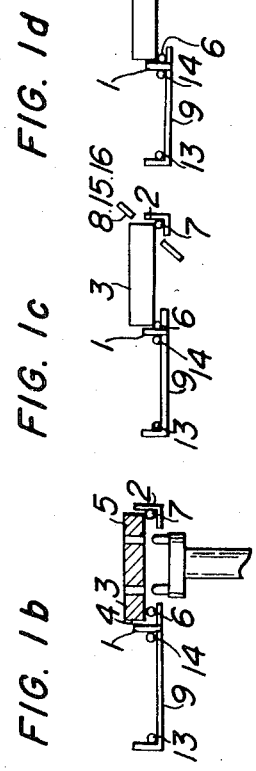

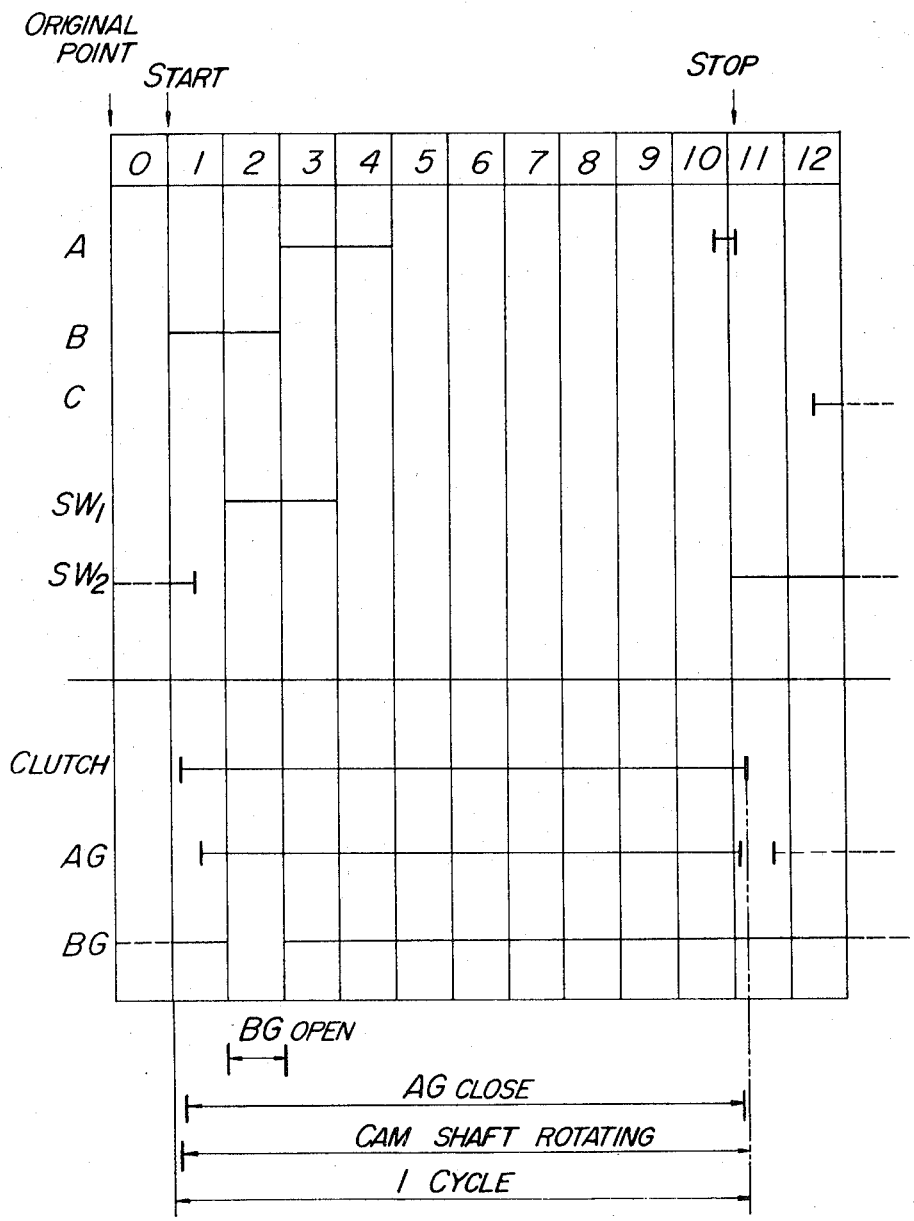

APPARATUS FOR ASSEMBLING OR WORKING A WORKPIECE

The present invention generally relates to a so-called transfer machine and more particularly to such a transfer machine in which a workpiece holder is transferred from one working station to another station.

In a conventional machine, such a transfer operation has been performed intermittently by using a linear index or a rotary index, or continuously by using a steel belt or a conveyor chain. Generally, the transfer device such as the index, the steel belt or the conveyor chain, and the part to be transferred such as the workpiece or the workpiece holder are closely positioned with each other so that desired operations can be performed. The known arrangement has been found to be unsatisfactory when it is applied to an operation in which light and weak workpieces or workpiece holders are handled, or in which even slight vibration of the transfer device or fine small foreign materials may have adverse effects, because in such applications production speed cannot be satisfactorily increased. Particularly, it is impossible to quickly remove inferior workpieces from the main production line or to recover the operation when the main line is accidentally stopped.

Further, in general, a transfer machine is controlled by an electrical or electronic system. In this known machine, electrical or magnetic noise or field may have an adverse effect on workpieces or measuring operation.

The present invention has an object to eliminate the aforementioned disadvantages of known arrangements.

A further object of the present invention is to provide a transfer machine which is particularly suitable for producing light and precise parts such as those for a watch at a lower cost with high productivity.

The above and other object of the present invention can be achieved by a transfer machine comprising a pair of guide rails for engaging and guiding opposite surfaces of each workpiece or workpiece holder, conveyor belt means adapted to be continuously moved along the guide rails and to carry thereon the workpiece or workpiece holder, fluidic means for detecting a passage of a workpiece or workpiece holder, an escape mechanism controlled by the fluidic detecting means to stop the workpiece or workpiece holder when it reaches a predetermined station, a jog plate adapted to be lifted when the workpiece or the workpiece holder is stopped at the station to engage therewith so that it is precisely positioned and at the same time it is disengaged from the moving conveyor belt, and means for lowering the jig plate when a desired work is completed to place the workpiece or the workpiece holder on the belt to be transferred to a next station.

An auxiliary belt means may be provided adjacent to and in parallel relation with the main conveyor belt for providing means for carrying and removing inferior workpieces from the main production line or providing an auxiliary line which may be used when the main line is accidentally stopped. The auxiliary belt may also be used to return used workpiece holders by moving the belt in the direction opposite to the movement of the main belt.

According to a further feature of the present invention, the speed of the main conveyor belt is utilized to perform desired controls. Before a workpiece or workpiece holder reaches the predetermined station where the jig plate is lifted, a source of mechanical command at the station such as a cam shaft is started to operate so that the production rate can be remarkably increased.

Thus, the present invention relates to a utilization of a fluidic control element. In the transfer machine of the present invention, a workpiece or workpiece holder moving on a conveyor belt is passed acrossed an air stream, an interruption of the air stream producing a signal indicating a passage of a workpiece or a workpiece holder.

In order that the present invention may be more clearly understood, reference will now be made to the accompanying drawings, in which;

FIG. 1a is a diagrammatic perspective view of a transfer system embodying the features of the present invention;

FIG. 1b is a diagrammatic sectional view showing the relation between a workpiece and a jig plate;

FIG. 1c is a diagrammatic cross sectional view showing the detector portion;

FIG. 1d is a diagrammatic cross-sectional view showing an escape mechanism;

FIG. 1e is a sectional view showing a mechanism for moving a workpiece from the main conveyor belt to the auxiliary conveyor belt;

FIG. 3 is a time sequence diagram at a working station of the machine;

Figure 2:
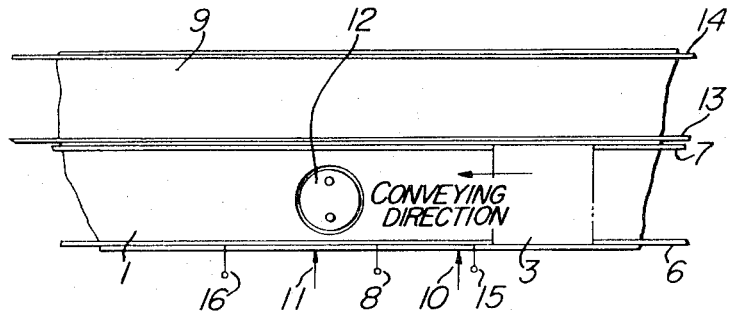
FIG. 2 is a plan view showing the arrangement of the main and auxiliary conveyor belts.
Figure 4:
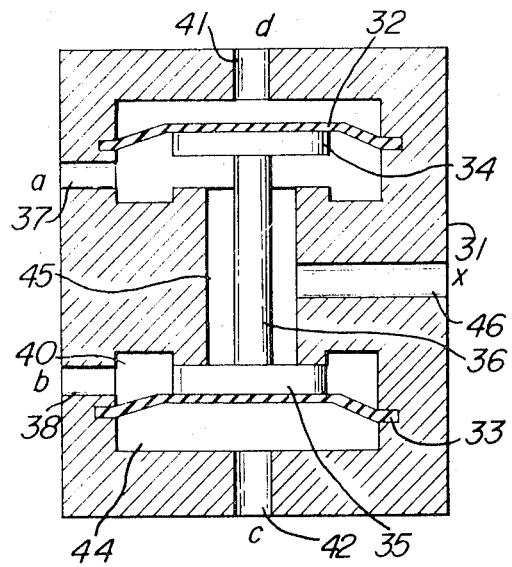
FIG. 4 is a sectional view of a fluidic element used in the embodiment of the present invention.
Figure 5:
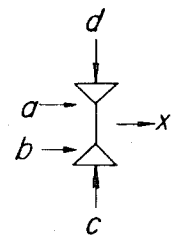
FIG. 5 is a symbolized representation of the fluidic element.

Referring to the drawings, particularly to FIG. 4, there is shown a fluidic element used in the machine embodying the present invention. The element may be of the type illustrated and described in Japanese patent application No. 17855/64 and comprising a cylindrical body (31), a pair of diaphragms (32) and (33) each secured at its periphery to the body (31), each of said diaphragms (32) and (33) having a valve (34) or (35) secured thereto, and a connecting rod (36) connecting the diaphragms (32) and (33) together. The body (31) is formed with inlet parts (37), (38), (41) and (42) and an outlet port (46). When a pressure (P) is introduced into each of the inlet ports, the pressure acts on the corresponding diaphragm having pressure receiving surfaces which may vary as the valves are opened or closed. FIG. 5 shows a symbolized form of the element.

Referring now to FIG. 1, the machine has a pair of guide rails (1) and (2) for guiding opposite surfaces (4) and (5) of a workpiece or a workpiece holder (3). A pair of conveyor belts (6) and (7) are arranged along the inner sides of the guide rails (1) and (2), respectively, for carrying thereon successive series of workpieces or workpiece holders (3). Along the path of the workpieces or the workpiece holders (3), there is provided a detector (8) which senses a workpiece or workpiece holder moving aside the sensor and causes an escape mechanism to operate to stop the workpiece or workpiece holder (3). The escape mechansim comprises a pair of pneumatic cylinders (10) and (11) as shown in FIG. 1. The workpiece or workpiece holder (3) thus stopped is then lifted by a jig plate (12) which is movable vertically through the space between the pair of conveyor belts (6) and (7) and adapted to engage with the workpiece or the workpiece holder (3) so as to precisely locate it. Thus, the workpiece or the holder (3) is disengaged from the moving belts (6) and (7) and a desired work such as machining or assembling is performed. Thereafter, the jig plate (3) is lowered until the workpiece or the holder (3) carried thereon is again placed on the moving conveyor belts (6) and (7) so that it is carried to a next station. In the illustrated embodiment, an additional guide rail and a further pair of auxiliary conveyor belts (13) and (14) are provided in parallel with the main conveyor belts (6) and (7). In this arrangement, a pair of auxiliary belts (6) and (7) are provided, however, it should of course be noted that only one auxiliary belt may be satisfactory for the purpose in some applications. The auxiliary conveyor belt means can be used for carrying and removing inferior workpiece from the main line, as an emergency production line which may be used when the main line is accidentally stopped, or for returning used workpiece holders (3) to the loading station of the main conveyor belts (6) and (7) by moving the auxiliary conveyor belts (13) and (14) in the direction opposite to the movement of the main conveyor belts (6) and (7).

According to the present invention, the transfer machine is further provided, in addition to the pneumatic type detector (8) which serves to sense a workpiece or workpiece holder engaged with the jig plate (12), with a second detector (15) for sensing a workpiece or workpiece holder (3) at an upstream side of the plate (12) so as to stop it there, and a third detector (16) for sensing a workpiece or workpiece holder (3) at a downstream side of the jig plate (12). As shown in the drawing, one pneumatic cylinder (10) of the escape mechanism serves to stop the workpiece or workpiece holder at an upstream side of the jig plate (12) and the other cylinder (11) serves to stop it at the position of the jig plate.

Further, according to the present invention, all of the control operations are performed pneumatically and, for this purpose, timing signal generators (18) and (19) are provided for co-operation with cams carried on a cam shaft (17). The signal generators (18) and (19) are connected together with the detectors (8), (15) and (16) to a group of amplifiers (21) which are in turn connected with a controller (22). The output of the controller (22) is utilized to control the positioning, stopping, transferring and other desired operations.

Further, as shown in FIG. 1 e, in order to remove an inferior workpiece from the main line or to transfer it from the main line to the auxiliary line when the former is stopped by an accident, a pair of gripping arms (25) and (26) are provided and actuated by an air pressure supplied from a line (24) to a workpiece take-out means (23). When the auxiliary conveyor belts (13) and (14) are used for receiving an inferior workpiece, there may be provided a removable and adjustable stopper (27) secured to the guide rail (9) at an appropriate position for providing a storage area for inferior workpieces.

The operation of the transfer machine will now be described making reference to FIG. 3 which shows a time sequence diagram at one working station. In FIG. 3, time is taken in abscissa while several signals are shown in ordinate. In the drawing, the basic inputs A, B and C are supplied from the workpiece detectors 8, 15 and 16 disposed along the conveyor belt and supplied in the order B, A and C. Further, in the drawing, the references $SW_1$ and $SW_2$ represent timing signals from mechanically movable parts such as the cam shaft (17). Output signals AG and BG are supplied to the escape mechanism (11) and 10, respectively, which serve to stop the clutch (20) for the cam shaft (17) and the workpiece or workpiece holder at each work station. When a signal B is produced by the corresponding detector to indicate a workpiece or workpiece holder (3) in position, the clutch (20) is energized to start the cam shaft (17) to rotate. Thus, the timing signal $SW_1$ from the cam shaft produces a signal BG to energize the escape mechanism so that the workpiece or workpiece holder is moved toward the jig plate. The other escape mechanism AG is closed when the timing signal $SW_2$ comes off. Then the workpiece or workpiece holder is stopped at the position of the escape mechanism AG. In order that the jig plate (3) is not lifted until precise positioning is performed, the cams are properly adjusted. Therefore, the jig plate is lifted after the workpiece or workpiece holder is properly positioned so that the former is engaged with the jig plate. Thus, the workpiece or the workpiece holder is precisely positioned and at the same time moved apart from the conveyor belt. After a desired work is done, the jig plate is lowered and the escape mechanism AG is again opened by the timing signal ($SW_2$) from the cam shaft (17) so as to convey the workpiece or the workpiece holder to a next work station.

The above operations can be represented by the following equations.

Command for the Work $= (\bar{A} \wedge B) \vee \overline{SW_2}$
$AG = \bar{C} \wedge SW_2$
$BG = \bar{A} \wedge SW_1$ In the above embodiment, the input signal for conveying a workpiece or workpiece holder from one station to another has been obtained by the position of the workpiece or workpiece holder being conveyed by the belt, however, it should of course be noted that the input signal may be given externally by for example a push button without departing from the scope of the invention. Further, the control may be performed by electronic or electrical means.

As described above, according to the present invention, a workpiece or workpiece holder is conveyed by means of a conveyer along guide rail means and lifted from the conveyor at a work or assembly station. Therefore, it is possible to eliminate any problems which may be caused by vibration, frictions and etc. with a very simple mechanism. Further, the workpiece or its holder is lifted apart from the guide rail means at the work station, the work or assembly operation can be performed in the lateral direction. Thus, the productivity can be enhanced. It is further possible to rotate the workpiece about a vertical axis after it is lifted, so that the workpiece can be arranged in any desired direction. The arrangement, in which a subsidiary line is provided in parallel with the main line for taking any false workpiece out of the line, enables to provide a take-out station for each work station. Further, the auxiliary line may be temporarily used in lieu of the main line when the latter is accidentally stopped.

According to the present invention, it is possible to provide a highly effective transfer machine which does not require a lot of line stock as required in a conventional machine and which is not subjected to an accidental stop. Since the workpiece or workpiece holder carried by the conveyor belt is stopped before it is lifted and the belt is moved with respect thereto, the workpiece or the workpiece holder should be as light as possible. Further, since there is no substantial friction between the workpiece or workpiece holder and the conveyor belt, a conventional detector having a feeler arm may interfere with the movement of the workpiece. This is the reason why a contact-less detector is required. The fluid type detecting and controlling system in accordance with the present invention does not produce any electrical or electromagnetic noise and does not have any adverse effect on machining or assembling of precise parts such as watch parts. The arrangement of the present invention ss well designed in that any handling can be controlled pneumatically using pneumatic cylinder and the like. Thus, the present invention can provide a less expensive and highly effective transfer machine which is particularly suitable for producing or assembling light and precise parts such as watch parts.

We claim:

1. A transfer machine comprising, conveying means having guide rail means for guiding a workpiece or a workpiece holder, conveyor belt means for conveying the workpiece or workpiece holder, means for detecting passage of the workpiece or workpiece holder to operate an escape mechanism having a jig plate for precisely positioning the workpiece or workpiece holder and at the same time relieving it from the moving conveyor belt means, and means for lowering the jig plate after a desired working or assembling operation is completed to return the workpiece or workpiece holder on the conveyor belt means to be carried to a next station.

2. A transfer machine in accordance with claim 1, which further comprises an auxiliary conveyor means having guide rails which are adjacent to and parallel with said conveying means.

3. A transfer machine in accordance with claim 1, which comprises contact-less fluidic detectors for one work station for detecting passage and existence of a workpiece or workpiece holder and producing command signals for the movement, stopping, working and assembling of the workpiece through fluidic control elements.

* * * * *